3,062,856
METAL-CONTAINING POLYMERS AND PREPARATION THEREOF

Gaetano F. D'Alelio, 2011 E. Cedar St., South Bend, Ind.
No Drawing. Filed Sept. 26, 1958, Ser. No. 763,476
22 Claims. (Cl. 260—448)

This invention relates to polymers containing at least two metals in the polymer molecules.

Because of the high energy content of such compounds, metal compounds having metal to carbon bonds, such as alkyl boranes, have been suggested as fuel compositions. However, because of their tendency to ignite spontaneously upon exposure to air, and the highly reactive nature of these compounds, the use of alkyl boranes involves considerable danger and necessitates various precautionary steps. Moreover, since they are liquids, their use as propellant fuels for rockets, missiles, and related devices has the drawbacks common to liquid fuels in that complicated containers and pumping devices are required, and the sloshing effect of the liquids in their containers causes shifting of weight which adversely affects directional control.

In accordance with the present invention, polymeric compounds have been discovered which contain two or more metals from the class consisting of boron, aluminum, beryllium, and magnesium, which have more easily controlled flammability and reactivity than the corresponding metal alkyl compound, while still retaining high energy content. Such polymeric materials can be made in the solid state, thereby having the inherent advantages of solid fuels used for propelling purposes.

Polymeric materials containing only one of such metals vary in properties according to the particular metal contained therein. It has now been found that, in addition to retaining the high energy fuel properties of such metal polymers, the desirable properties of two or more of such metal polymers can be imparted to a polymeric composition by incorporating two or more of the corresponding metals into such compositions.

The polymeric compositions of this invention are prepared from metal hydrides, including the various polymeric metal hydrides, and the mono- and poly-substituted metal hydrides in which the substituents are hydrocarbon groups, by reaction with one or more predomininantly hydrocarbon compounds, including hydrocarbons and ethers, together with their derivatives having substituents therein which are nonreactive to the metal compounds, having at least one acetylenic group, or a plurality of ethylenically unsaturated groups therein, hereinafter generally referred to as unsaturated groups.

The polymeric compositions of this invention are prepared by the simultaneous or separate reaction of compounds containing the two or more metals with a mass comprising at least one compound containing the unsaturated groups. The metal compounds which can be used in preparing these compositions include: boron hydrides, aluminum hydrides, beryllium hydrides, magnesium hydrides, and the hydrocarbon-substituted derivatives of these hydrides, sometimes generally referred to hereinafter as metal compounds or metal hydride compounds.

Typical boron hydrides, or boranes, and substituted boranes that can be used include, but are not limited to, the following: diborane, triborane, tetraborane, pentaborane, hexaborane, decaborane, trimethyl borane, triethyl borane, tripropyl borane, tributyl borane, triamyl borane, triallyl borane, tributenyl borane, trihexyl borane, tri-octyl borane, tri-decyl borane, tri-tetradecyl borane, tri-cyclohexyl borane, triphenyl borane, triphenethyl borane, monomethyl diborane, symmetrical dimethyl diborane, unsymmetrical dimethyl borane, trimethyl diborane, tetramethyl diborane, monoethyl diborane, symmetrical diethyl diborane, unsymmetrical diethyl diborane, triethyl diborane, tetraethyl diborane, monopropyl diborane, symmetrical dipropyl diborane, unsymmetrical dipropyl diborane, tripropyl diborane, tetrapropyl diborane, trimethyl triborane, tetramethyl triborane, hexamethyl triborane, tetraethyl tetraborane, hexaethyl tetraborane, etc.

Typical aluminum hydride compounds that can be used in the practice of this invention include, but are not limited to, the following: aluminum hydrides, including the various polymeric forms $(AlH_3)_x$, dimethyl aluminum hydride, diethyl aluminum hydride, dipropyl aluminum hydride, dibutyl aluminum hydride, dipentyl aluminum hydride, diphenethyl aluminum hyrdride, dicyclohexyl aluminum hydride, methyl aluminum dihyride, ethyl aluminum dihydride, propyl aluminum dihydride, butyl aluminum dihydride, pentyl aluminum dihydride, phenethyl aluminum dihydride, 2-ethyl-hexyl aluminum dihydride, cyclohexyl aluminum dihydride, cyclopentyl aluminum dihydride, cyclohexylethyl aluminum dihydride, cyclopentylethyl aluminum dihydride, trimethyl aluminum, triethyl aluminum, tripropyl aluminum, triallyl aluminum, tributenyl aluminum, tributyl aluminum, triisobutyl aluminum, tripentyl aluminum, tri-(2-decyltetradecyl)aluminum, tri-(2-ethyl-hexyl) aluminum, triphenethyl aluminum, tri-benzyl aluminum, triphenyl aluminum, tritolyl aluminum, tetramethyl dialuane, trimethyl dialuane, pentamethyl dialuane, symmetrical diethyl dialuane, tetraethyl dialuane, pentaethyl dialuane, etc.

Typical examples of the beryllium hydrides and hydrocarbon-substituted derivatives which can be used in the practice of this invention include, but are not limited to, the following: beryllium hydride, beryllium alkyl hydrides, such as methyl beryllium hydride, ethyl beryllium hyrdide, propyl beryllium hydride, butyl beryllium hydride, octyl beryllium hydride, nonyl beryllium hydride, styryl beryllium hydride, cyclohexyl beryllium hydride, phenyl beryllium hydride, dimethyl beryllium, diethyl beryllium, methyl ethyl beryllium, diallyl beryllium, dibutenyl beryllium, dipropyl beryllium, dibutyl beryllium, ethyl butyl beryllium, diamyl beryllium, dioctyl beryllium, distyryl beryllium, methyl phenyl beryllium, dicyclohexyl beryllium, ethyl cyclohexyl beryllium, dicyclopentyl beryllium, etc.

Typical examples of the magnesium hydrides and hydrocarbon-substituted derivatives which can be used in the practice of this invention include, but are not limited to, the following: magnesium hydride, magnesium alkyl hydrides, such as methyl magnesium hydride, ethyl magnesium hydride, propyl magnesium hydride, butyl magnesium hydride, octyl magnesium hydride, nonyl magnesium hydride, styryl magnesium hydride, cyclohexyl magnesium hydride, phenyl magnesium hydride, dimethyl magnesium, diethyl magnesium, methyl ethyl magnesium, diallyl magnesium, dibutenyl magnesium, dipropyl magnesium, dibutyl magnesium, ethyl butyl magnesium, diamyl magnesium, dioctyl magnesium, distyryl magnesium, methyl phenyl magnesium, dicyclohexyl magnesium, ethyl cyclohexyl magnesium, dicyclopentyl magnesium, etc.

These metal hydride compounds and the hydrocarbon derivatives thereof, sometimes generally referred to hereinafter as metal hydride compounds, or metal compounds, can be used as such, or in various complex forms, such as complexes with ethers, tertiary amines, thioethers, etc.

It is not intended that the invention be limited to any particular theory, or to any particular formula. It is believed, however, that the polymers obtained by the practice of this invention can be represented by the formula R—(M—Y—)$_n$MR wherein R is hydrogen or a hydrocarbon group, M is Be, Mg, BX, or AlX, in which X is R or Y, *n* is an integer having a value of at least 2, preferably at least 4, and Y is a polyvalent radical derived from the acetylenic or polyalkenyl compound, and having as many valencies as there are metal atoms attached thereto. When Y is derived from a dialkenyl compound or a monoacetylenic compound, Y is a divalent radical. When derived from trialkenyl compounds or an acetylenic compound also containing an alkenyl group or a second acetylenic group, Y can also be a trivalent radical.

While it is believed that each metal atom becomes attached to one of the carbon atoms of the unsaturated group, it is also possible that the metal migrates during or after reaction between the metal compound and the unsaturated compound and becomes attached to another carbon atom of the unsaturated compound that gives a more stable derivative. Thus, the metal may actually be attached to one of the carbon atoms of an unsaturated group, or to one of the groups adjacent to the unsaturated group. Because of this possible migration of the metal atoms, it is not intended that the carbon atoms of the Y groups to which the metal is attached should be pinpointed as or limited to those carbon atoms of the original unsaturated group.

Unsaturated compounds which can be used in the practice of this invention are acetylenic, allenic, or polyalkenyl compounds, having one of the following formulas:

$$RC \equiv CR \text{ or } R_2C = C = CR_2 \text{ or } R_2C = CR - Z - CR = CR_2$$

wherein R is hydrogen or hydrocarbon and Z is either a bond between the two adjacent carbon atoms or a divalent radical having ether oxygen, hydrocarbon, or combinations of both, between its two valencies. R and Z can have additional unsaturated groups included therein, as well as other groups which are substantially nonreactive with the metal hydride compounds. Typical examples of such unsaturated compounds are listed hereinafter.

When the polymeric composition of this invention contains beryllium and magnesium, the polymers are thermoplastic unless there is also present in the polymer molecule a trivalent group which can provide crosslinkages between polymer molecules. Such crosslinkages can be provided by a Y group having three or more valencies. This can be effected by using polyalkenyl compounds having three or more alkenyl groups therein, or by using an acetylenic compound containing at least one or more additional acetylenic or ethylenic groups therein. The crosslinkage can also be effected through a trivalent metal, for example, aluminum or boron. When either aluminum or boron is present in the polymeric composition, infusible polymers can be obtained by the crosslinkages provided by such metals, as well as by any Y groups having three or more valencies.

When the hydrides or hydrocarbon derivatives thereof of two or more metals are reacted simultaneously with the unsaturated compounds, the corresponding metals are distributed at random throughout the resulting polymer molecules. The nature of such random distribution depends on the differences in the reactivity of the various metal hydride compounds, the concentrations thereof, and various other factors. It is also possible to get alternate distribution of the two or more metals throughout the polymer molecules and also to get block distribution of one metal and then another metal, and also various degrees of such types of metal distribution. By incremental addition of one metal compound, followed by a reaction period, and then by subsequent incremental addition of a compound of one of the other metals, followed by a subsequent reaction period, etc., it is possible to alternate metal addition by blocks, of metal atoms. For example, a polymer obtained by the block addition of beryllium and magnesium compounds can be represented, at least in part, as:

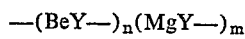

When it is desired to carefully control the addition so as to obtain metal atoms of alternate types, evenly distributed, this can be accomplished to a certain degree by carefully controlling the addition of one metal to the unsaturated compound, and stopping the addition so as to produce essentially a monomeric unsaturated product, such as dibutenyl beryllium, diallyl magnesium, dibutenyl boron hydride, diallyl ethyl aluminum, tributenyl aluminum, etc., and then adding a metal hydride compound of a second metal to the reaction mass containing the monomer. The second metal will add to the unsaturated group of the monomer and thereby provide alternate types of metal as the polymer molecule builds up. For example, the polymer obtained by the addition reaction of dibutenyl beryllium and magnesium hydride can probably be represented, at least in part, as:

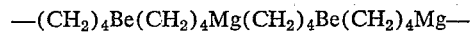

Likewise, the product obtained by the addition reaction of triallyl aluminum with triethyl boron can probably be represented, at least in part, as:

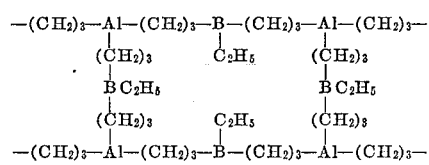

Mixtures of such alkenyl monomers of two or more of these metals can also be condensed to form polymers by the elimination of the starting polyalkenyl or acetylenic compound. Such mixtures can also be polymerized by the addition of any of the metal hydrides or their hydrocarbon substituents. For example, tributenyl boron and dibutenyl magnesium can be polymerized by heating and eliminating butadiene, or by the addition of aluminum hydride or diethyl beryllium and reacting according to the conditions described herein. Derivatives can also be used in the practice of this invention in which two of the metals have been added to the same polyalkenyl compound, e.g. to produce an intermediate such as

These are considered as included in the class of metal hydride hydrocarbon derivatives which can be used in the practice of this invention. These can produce polymers by further reaction with polyunsaturated or acetylenic compounds.

The optimum conditions for promoting the addition of the metal compounds to produce the polymeric compositions of this invention depend upon the type of reagents being used. For example, the terminal or pendant types of unsaturated groups, such as vinyl, vinylidene, or terminal acetylenic groups, require lower temperatures and shorter heating periods than are required in the case of unsaturated groups having substituents at both ends of the unsaturated group. Furthermore, the type of metal compound also influences the rate and degree of addition. For example, the unsubstituted hydrides react more easily and at lower temperatures than the substituted derivatives. The partially substituted hydrides react more easily and at lower temperatures than do the fully substituted derivatives. Likewise, the size of the substituents also has an influence on the ease and speed of reaction.

These differences in the ease and speed of reaction, however, are used to advantage in many cases since it permits better control over the rate and type of addition and the rate and degree of crosslinking. It is generally desirable to have a high percentage of the metal compound in the polymer molecules before enough crosslinking of polymer molecules is effected to slow down the addition reaction. For that reason, it is sometimes advantageous to use partially substituted metal hydrides or completely substituted metal compounds having hydrocarbon groups of different size or reactivity. It is also advantageous to have the hydrocarbon substituent groups of such a size and type that will produce volatile byproducts which are easily removed from the reaction medium. In some cases, too, it is also desirable to have the hydrocarbon substituent group of such a type as to give off an olefinic byproduct having strong addition polymerization tendencies, and thereby permit copolymerization of the byproduct with the metallo-addition product.

It is generally suitable to use temperatures in the range of 50°–80° C. to permit the addition of the unsubstituted hydrides to the unsaturated groups. Temperatures in the range of 80°–100° C. are generally suitable to promote reaction of the partially substituted hydrides, and temperatures in the range of 100°–140° C. are generally suitable for the fully substituted metal compounds. It is generally desirable to complete replacement of the hydrocarbon substituents from partially substituted metal compounds by subsequently taking the temperature into the highest temperature range. Lower temperatures than indicated can also be used for the respective additions provided longer reaction periods are used.

The polymeric products of this invention range from viscous oils to solid thermoplastic or thermoset resins. Depending upon the particular starting materials, modifiers, and polymerization conditions, the polymers range in molecular weight from about 200 to 100,000 and higher.

The percentage of metal in the polymeric products of this invention depends on various factors, such as the number of unsaturated groups per unit weight of unsaturated compounds, the degree of metal addition before crosslinking, the type of substituent groups on the metal compound, the amount of modifiers used, etc. For example, an unsaturated compound having a high number of unsaturated groups per unit of weight permits the introduction of a larger percentage of metal than is permitted by one having a smaller number of unsaturated groups per unit weight. In this connection, obviously, since acetylenic groups have a functionality of 2 in the metal addition reactions, they are considered as the equivalent of two alkenyl groups. Generally the effect of the presence of a metal in the compositions of this invention can be noted with as little as 0.05 percent of the metal contained in the polymer molecule. For fuel purposes, it is generally desirable that the polymeric products contain at least about 4 percent combined metal content and up to about 30 percent, or even more. When a high proportion of boron is desired in the ultimate product, it is preferred that the unsaturated compound be of relatively low molecular weight, generally not over 200 or 300.

Various modifications of the polymeric materials can be made by adjusting the proportions of reactants and the conditions under which the materials are made to react. For example, in cases where trifunctional materials are used which will effect crosslinking, control of the proportions of the reactants enables control over the amount of crosslinking and the amount of polymer formation before crosslinking is effected. Thus, by increasing the proportion of the crosslinking agent, crosslinking takes place at a lower degree of conversion than is otherwise the case. The selectivity, type of reaction, and product can also be controlled somewhat by selecting the appropriate metal compound, concentration thereof, and by the use of certain amounts of monoalkenyl compounds. For example, since the reaction of the hydrogen in the metal compounds is more easily effected than the replacement of the hydrocarbon groups to form olefins or otherwise react, it is possible thereby to control somewhat the type and extent of reaction by using partially substituted metal hydrides and using conditions which favor hydrogen reaction and not hydrocarbon replacement.

Moreover, since it is easier to replace some types of hydrocarbon groups than others, some control over the type and extent of reaction can be effected by using metal compounds substituted with hydrocarbon groups of different sizes and types. It is generally desirable that the hydrocarbon group to be replaced by the unsaturated compound be of a smaller size than the unsaturated compound. For example, when using butadiene with a trialkyl borane, the triethyl borane is advantageously used; whereas, when divinyl benzene is used, the triethyl or higher derivative, such as tripropyl, tributyl, triamyl, trihexyl, triphenyl, etc., can advantageously be used.

Various modifiers can be used in the reaction mixture. Such modifiers include those which react simultaneously with the metal compounds, in which case sufficient metal compound should be used to react with both the unsaturated compound and the reactive modifier. Such modifiers include: monoalkenyl hydrocarbons and ethers, such as styrene, vinylethyl ether, etc. The nonreactive type of modifiers would include those which are incorporated to modify the properties of the polymeric products, for example, to make them more stable or more suitable for their ultimate purposes, as well as those which are incorporated for subsequent reaction. This latter type of modifier includes the solid and liquid oxidants which can be incorporated if the polymeric product is to be used for fuel purposes. These oxidants can be of either a supplementary or self-sustaining type for the subsequent oxidation.

When an alkenyl modifier is used, or is released by the reaction, which contains very active polymerizable vinyl or vinylidene groups, such as styrene, the polymer products can be modified by effecting addition polymerization with alkenyl groups in the addition polymers. The various modifiers are listed hereinafter.

The addition of the metal compounds to the unsaturated compounds can be promoted by the use of catalysts which include, for example, diethyl ether, diisopropyl ether, tetrahydrofurane, diglyme, etc. Traces of the ether will catalyze the reaction and unless the ether is to be used also as a solvent or diluent there is generally no need to have more than about 5 percent ether present. Particularly useful to catalyze this reaction are the borane derivatives which contain ether groups therein, including, but not limited to: mono-(beta methoxy-ethyl)-borane, bis-(beta methoxy-ethyl)-borane, tris-(beta methoxy-ethyl)-borane, mono-(beta ethoxy-ethyl)-borane, bis-(beta ethoxy-ethyl)-borane, tris-(beta ethoxy-ethyl)-borane, mono-(beta methoxy-ethyl) dimethyl-borane, bis-(beta ethoxy-ethyl) ethyl borane, beta-(ethoxy-phenyl)-ethyl borane, beta-(ethoxy-cyclohexyl)-ethyl borane, etc. Such boron ether derivatives can be prepared simply by the addition of boranes to ethylenically unsaturated ethers, such as vinyl benzyl ether, vinyl ethyl ether, vinyl butyl ether, vinyl propyl ether, vinyl amyl ether, vinyl cyclohexyl ether, vinyl phenyl ether, vinyl tolyl ether, isopropenyl methyl ether, isopropenyl isopropyl ether, isopropenyl butyl ether, isopropenyl phenyl ether, isopropenyl amyl ether, isobutenyl ethyl ether, allyl methyl ether, allyl ethyl ether, allyl propyl ether, butenyl ethyl ether, butenyl propyl ether, pentenyl amyl ether, vinyl cyclohexyl ether, vinyl cyclopentyl ether, para-vinyl anisole, allyl benzyl ether, vinyl benzyl ether, vinyl phenethyl ether, isopropenyl phenethyl ether, etc. Such unsaturated ethers can also be added directly to the reaction mixture to serve as modifiers as well as catalysts. Traces of the ether compounds are sufficient to catalyze reaction markedly. The ether advantageously is used in minor amount and unless it is also to be used as a modifier there is no need for more than 5 percent required for catalytic purposes. In the absence of a catalyst, the polymerization can be effected by the use of higher temperatures, but below the decomposition temperature of the boranes, with the reaction mixture as such, or dissolved in hydrocarbon solvents.

In cases where the metal compound is gaseous or volatile, the reaction advantageously can be carried out by dissolving the unsaturated starting material in an ether or hydrocarbon solvent, such as diethyl ether, diisopropyl ether, tetrahydrofurane, diglyme, hexane, heptane, benzene, toluene, xylene, etc., and passing the metal compound into the reaction solution, maintained at the desired temperature, and in an inert atmosphere, such as nitrogen. Obviously, a solvent will be selected whose reflux temperature will be appropriate for the desired reaction conditions.

Various methods of practicing the invention are illustrated by the following examples. These examples are intended merely to illustrate the invention and not in any sense to limit the manner in which the invention can be praticed. The parts and percentages recited therein, and also in the specification, unless specifically provided otherwise, refer to parts by weight and percentages by weight. Unless indicated otherwise, the terms "polymer" and "polymeric" are intended to include "copolymers" and "copolymeric."

EXAMPLE I

A mixture of 10 parts of triethyl borane, 15 parts of triallyl aluminum, and 0.5 part of dioxane is heated under an atmosphere of methane for 15 hours at 70° C. An insoluble, infusible product is obtained. This polymer is believed to have, at least in part, repeating units of the following structure:

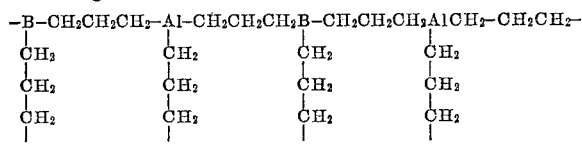

The product is washed with heptane to extract traces of unconverted metal compounds. The washed product is more stable in air than is the ordinary organo-metal compounds which oxidize and burn in air. This product is ground with an equal weight of ammonium perchlorate. The resultant mixture, when ignited and tested according to known tests for propellant thrust, shows excellent thrust properties.

EXAMPLE II

Using equivalent amounts of diallyl magnesium and diallyl beryllium, respectively, in place of the triallyl aluminum, and in each case repeating the procedure of Example I, two solid products are obtained which are believed to have repeating units of the following structures:

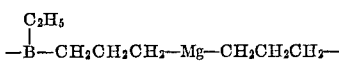

and

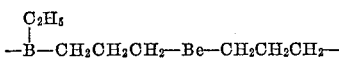

With each of these products, three different tests are performed in which four parts of the polymer product is ground individually with six parts of ammonium nitrate, lithium perchlorate, and potassium perchlorate, respectively. In each case, the mixture when ignited, burns very rapidly with an intense white flame, and, upon testing for thrust properties, shows excellent thrust.

EXAMPLE III

Seven experiments were performed in which the various mixtures of metal compounds and unsaturated compounds indicated in the table below are treated individually according to the following procedure. The mixture is heated in an atmosphere of nitrogen at 50° C. for a period of 12 hours. Then, the temperature is raised to 100° C. for 5 hours. The product is then cooled and washed with heptane to extract traces of unconverted metal compounds. The washed product is then ground with an equal weight of ammonium perchlorate, and, when ignited and tested for thrust properties, shows excellent burning and thrust properties.

*Table*

| Metal Compounds | Unsaturated Compound (and modifier or catalyst) |
|---|---|
| 18 Tri-sec.-butyl borane. <br> 20 Tri-sec.-butyl aluminum. | 35 Divinyl benzene. <br> 35 Ethyl styrene. <br> 2 Diethyl ether. |
| 18 Tri-sec.-butyl borane. <br> 12 Di-sec.-butyl beryllium. | 25 Divinyl ether. |
| 18 Tri-sec.-butyl borane. <br> 14 Di-sec.-butyl magnesium. | 40 Divinyl benzene. <br> 5 Ethylvinyl ether. |
| 20 Tri-sec.-butyl aluminum. <br> 12 Di-sec.-butyl-beryllium. | 55 Divinyl naphthalene. <br> 5 Styrene. |
| 20 Tri-sec.-butyl aluminum. <br> 7 Di-sec.-butyl magnesium. | 40 Diallyloxy benzene. |
| 14 Di-sec.-butyl magnesium. <br> 12 Di-sec.-butyl beryllium. | 25 Divinyl benzene. <br> 8 Trivinyl benzene. |
| 20 Tri-sec.-butyl aluminum. <br> 10 Dicyclohexyl beryllium. | 32 Diisopropenyl benzene. |

EXAMPLE IV

Eight experiments were performed in which the various mixtures indicated in the table below were treated individually according to the following procedure. The mixture, in each case, is heated under a nitrogen atmosphere, initially at 50° C. for 5 hours. Then the temperature is raised to 80° C. for 10 hours, and then at 100° C. for an additional 5 hours. Upon processing and testing the infusible products, in accordance with the procedure of Example II, similar results are obtained.

*Table*

| Metal Compound | Unsaturated Compound |
|---|---|
| 10 Triethyl borane. <br> 16 Tripropyl aluminum. | 16 Divinyl anisole. <br> 26 Divinyl benzene. |
| 10 Triethyl borane. <br> 5 Dipropyl beryllium. | 30 p-Vinyloxystyrene. |
| 14 Tripropyl borane. <br> 10 Dicyclohexyl magnesium. | 50 p-Allyoxystyrene. |
| 12 Triethyl aluminum. <br> 22 Distyryl beryllium. | 40 Divinyl cyclohexane. |
| 16 Tripropyl aluminum. <br> 18 Diphenyl magnesium. | 22 Vinyl cyclohexene. |
| 16 Diphenyl beryllium. <br> 23 Distyryl magnesium. | 13 Divinyl benzene. <br> 21 Triallyloxy propane. |
| 8 Diethyl magnesium. <br> 7 Diethyl beryllium. | 25 Phenylene diacetylene. |
| 11 Dipropyl magnesium. <br> 8 Dipropyl beryllium. | 20 p-Vinyl phenylacetylene. |

EXAMPLE V

A solution of 3 parts of aluminum hydride in 50 parts of ether is dropped, over a period of an hour, into a mixture of 65 parts of divinyl benzene and 100 parts of diethyl ether maintained at the reflux temperature of the ether and under an atmosphere of nitrogen. After the aluminum hydride solution is all added, the temperature is maintained at reflux for an additional period of 3 hours. Then, diborane is fed into the reaction solution until 1.5 parts has been absorbed. The heating is continued at reflux temperature for an additional 2 hours. Then the ether is distilled off and the temperature gradually raised to 80° C. for five hours, and then to 100° C. for 15 hours. The insoluble product exhibits excellent burning and thrust properties, when tested according to Example II.

EXAMPLE VI

A solution of 20 parts of isoprene and 50 parts of ether is maintained at reflux temperature while a solution of one part beryllium hydride in ten parts of ether is dropped in over a one hour period under an atmosphere of nitrogen. The refluxing is continued for an additional hour. Then, a solution of 6 parts of ethyl aluminum dihydride in 20 parts of ether is dropped in over a period of one hour, following which the ether is distilled from the reaction mixture and the temperature raised to 50° C. for 5 hours, then to 80° C. for an additional 5 hours, and then to 100° C. for an adidtional 10 hours. Excellent burning and thrust properties are exhibited by the products.

EXAMPLE VII

When the procedure of Example V is repeated, using an equivalent amount of diallyloxy benzene in place of the divinyl benzene, and an equivalent amount of ethyl magnesium hydride in place of the aluminum hydride, an insoluble product is obtained, which exhibits excellent burning and thrust properties.

EXAMPLE VIII

The procedure of Example VI is repeated, with similar results, using an equivalent amount of phenyl acetylene in place of the isoprene, and 4 parts of tetramethyl diborane in place of the ethyl aluminum dihydride.

EXAMPLE IX

The procedure of Example VI is repeated, using an equivalent amount of magnesium hydride in place of the beryllium hydride. Similar results are obtained.

EXAMPLE X

The procedure of Example VI is repeated, with similar results, using an equivalent amount of magnesium hydride in place of the ethyl aluminum dihydride, and also 15 parts of triallyloxy propyl boron.

EXAMPLE XI

Ten parts of the polymer of Example I is mixed uniformly with 40 parts of finely divided ammonium perchlorate and a solution of 9 parts of styrene, 1 part of a 50–50 commercial divinyl benzene-ethyl styrene, and 0.1 part of benzoyl peroxide. The mixture is cast and maintained at 70° C. for 12 hours. An insoluble, infusible fuel product is obtained which shows excellent thrust properties.

EXAMPLE XII

The procedure of Example I is repeated 8 times, using in each case a mixture of 9 parts of tri-isobutyl borane, 10 parts of tri-isobutyl aluminum, one part of diethyl ether, and with each experiment a progressively smaller amount of divinyl benzene, as follows: 52, 39, 26, 13, 8.7, 6.5, 4.3 and 3.2 parts, respectively. In each case a solid product is obtained which shows excellent burning and thrust properties when tested as in Example I.

Similar results are obtained when 7 parts of dibutyl aluminum and 8 parts of tributyl magnesium, respectively, are individually substituted for tributyl aluminum and the above procedure repeated.

Typical unsaturated compounds that can be used in preparing polymers according to the practice of this invention include, but are not limited to, the following: butadiene, isoprene, 2,3-dimethyl butadiene, pentadiene-1,3, hexadiene-2,4, octadiene-2,4, hexatriene-1,3,5, 2-phenyl-butadiene, 1,4-pentadiene, hexadiene-1,5, 2,4-dimethyl-pentadiene-1,4, vinyl cyclohexene, 1-phenyl-pentadiene-1,3, divinyl cyclohexane, diallyl, 1,6-heptadiene, 1,8-nonadiene, 2,8-decadiene, 2,9-dimethyl-2,8-decadiene, divinyl cyclopentane, divinyl methyl cyclohexane, diallyl cyclohexane, diallyl cyclopentane, dibutenyl cyclohexane, dipentenyl cyclohexane, allyl cyclohexene, diallyl cyclohexene, divinyl cyclohexene, (beta-vinylalkyl)-furane, (beta-allyl-ethyl)-furane, 1,7-diphenyl-heptadiene-1,6, 2,7-diphenyl-otadiene-1,7, divinyl benzene, trivinyl benzene, divinyl napthalene, trivinyl naphthalene, divinyl diphenyl, trivinyl diphenyl, divinyl toluene, trivinyl toluene, divinyl xylene, divinyl anisole, divinyl ethyl benzene, divinyl chlorobenzene, divinyl methylnaphthalene, divinyl ethylnaphthalene, divinyl methyldiphenyl, divinyl ethyldiphenyl, divinyl ethoxy napthalene, divinyl chloronaphthalene, divinyl chlorodiphenyl, divinyl ethoxy diphenyl, vinyl isopropenyl benzene, vinyl isopropenyl naphthalene, vinyl isopropenyl diphenyl, vinyl isopropenyl toluene, vinyl isopropenyl anisole, vinyl isopropenyl chlorobenzene, vinyl isopropenyl methoxy naphthalene, vinyl isopropenyl chloronaphthalene, vinyl isopropenyl methyl chloronaphthalene, vinyl isophopenyl chlorodiphenyl, vinyl isopropenyl methoxy diphenyl, vinyl isobutenyl benzene, vinyl isobutenyl naphthalene, vinyl isobutenyl diphenyl, vinyl allyl benzene, vinyl allyl naphthalene, vinyl allyl diphenyl, vinyl allyl toluene, vinyl allyl anisole, vinyl allyl methylnaphthalene, vinyl allylchlorodiphenyl, diallyl benzene, triallyl benzene, diallyl naphthalene, triallyl naphthalene, diallyl diphenyl, triallyl diphenyl, diallyl toluene, diallyl xylene, diallyl chlorobenzene, diisopropenyl benzene, diisopropenyl naphthalene, diisopropenyl diphenyl, diisopropenyl toluene, diisopropenyl anisole, diisopropenyl methyl naphthalene, diisopropenyl vinyloxy diphenyl, dimethallyl benzene, dimethallyl naphthalene, dimethallyl diphenyl, bis-(alpha-ethyl-ethenyl)-benzene, bis-(alpha-ethyl-ethenyl)-naphthalene, bis-(alpha-ethyl-ethenyl)-diphenyl, bis-(alpha-vinyl-ethyl)-benzene, bis-(alpha-vinyl-ethyl)-naphthalene, bis-(alpha-vinyl-ethyl)-diphenyl, vinyl (alpha-vinyl-ethyl)-benzene, vinyl (alpha-vinyl-ethyl)-naphthalene, vinyl (alpha-vinyl-ethyl)-diphenyl, dipropenyl benzene, p-propenyl styrene, para-propenyl isopropenyl-benzene, dicrotyl benzene, dicrotyl naphthalene, dicrotyl diphenyl, dicrotyl anisole, dicrotyl xylene, bis-(4-vinyl-n-butyl)-benzene, bis-(5-isopropenyl-n-hexyl)-benzene, bis-(5-isopropenyl-n-hexyl)-diphenyl, bis-(5-methyl-hepten-5-yl)-benzene, bis-(5-methyl-nonene-6-yl)-diphenyl, bis(n-decen-5-yl)-toluene, di-cyclopentenyl-naphthalene, divinyl carbazole, di-cyclohexenyl-benzene, allene, acetylene, n-hexen-5-yl-acetylene, b,b'-dimethyl phenylenediacetylene, p-vinyl-phenyl acetylene, naphthalene diacetylene, ethylene diacetylene, cyclohexylene diacetylene, n-hexen-5-yl-acetylene, b,b'-dimethyl phenylenediacetylene, 1-methyl-2-vinyl-acetylene, 1-methyl-2-isopropenyl-acetylene, 1-methyl-2-propenyl-acetylene, divinyl ether, diallyl ether, vinyl allyl ether, propenyl vinyl ether, propenyl allyl ether, divinyl ether of resorcinol, divinyl ether of ethylene glycol, diisopropenyl ether, isopropenyl vinyl ether, isopropenyl allyl ether, isopropenyl butenyl ether, isopropenyl isoamylene ether, diallyl ether of resorcinol, diisobutenyl ether of hydroquinone, paravinyloxy styrene, para allyloxy styrene, trialloxy benzene, tripropenyloxy benzene, propargyl ethyl ether, dipropargyl ether, etc.

As indicated above, various modifiers can be added, either prior to the initiation of the addition reaction, at some intermediate stage, or after the reaction is completed. Such modifiers include various other resins, such as: polystyrene, polyethylene, polypropylene, polybutenes, paraffins, polyvinyl ethers, such as polymeric vinyl ethyl ether, polymeric vinyl butyl ether, etc. Certain other resins containing ester, amide, or other groups that may be reduced or reacted upon by the metal compounds can be added after the boron polymers are formed. However, if sufficient metal compound is added to compensate for that used in such side reactions, such resins can also be added before or during the reaction. Such resins include: polyesters, such as polyvinyl acetate, polyvinyl propionate, polyvinyl butyrate, polymethyl methacrylate, polymethyl acrylate, etc., polyvinyl acetal, polyvinyl butyral, etc., polyacrylonitrile, polyamides, such as nylon and polymeric caprolactam, etc.

Various other unsaturated compounds can also be added, either before initiation of the addition reaction, at an intermediate stage, or after completion of the reaction, to modify the properties of the products. With regard to compounds which are reactive with the metal hydrides or derivatives, the same comments apply as made above with respect to resins having ester groups, etc. Such unsaturated compounds include: polyunsaturated esters, polyunsaturated amides, polyunsaturated ether-esters, and various corresponding mono-unsaturated compounds.

Typical mono-alkenyl modifiers that can be used in the practice of this invention, by adding at any stage of the reaction, include, but are not limited to, the following: ethylene, propylene, butene-1, butene-2, hexene-1, hexene-2, t-butyl-ethylene, 2,4,4-trimethyl-1-pentene, 2,4,4-trimethyl-pentene-2, cyclopentene, cyclohexene, styrene, 1,1-diphenyl ethylene, vinyl cyclohexane, alpha-methyl-styrene, vinyl naphthalene, beta-methyl styrene, allyl benzene, allyl cyclohexane, decene-1, decene-2, decene-3, decene-4, decene-5, dodecene-1, dodecene-2, tetradecene-1, hexadecene-2, cyclopentene, etc., and also the mono-alkenyl ethers listed above as suitable for the preparation of ether-borane compounds.

For many purposes, such as fuel, it is desirable to have a high concentration of the metallo-organo polymeric units present in the compositions. In such cases, the modifiers are used in minor amounts. However, in certain cases, it may be desirable to use the metallo-organo polymeric compositions to modify or fortify the properties of other materials, in which case the metallo-organo derivatives are used in minor amounts.

In addition to the various polyunsaturated monomers listed above, the following can also be used as modifiers: diisopropenyl chlorodiphenyl, allyl methyl ether, allyl ethyl ether, allyl propyl ether, allyl acrylate, allyl methacrylate, vinyl acrylate, vinyl methacrylate, isopropenyl acrylate, isopropenyl methacrylate, butenyl acrylate, butenyl methacrylate, vinyl crotonate, allyl crotonate, isopropenyl crotonate, propenyl crotonate, isobutenyl crotonate, ethylene glycol diacrylate, trimethylene glycol diacrylate, tetramethylene glycol diacrylate, pentamethylene glycol dimethacrylate, divinyl phthalate, diallyl phthalate, diisopropenyl phthalate, dibutenyl phthalate, divinyl diphenyl-dicarboxylate, diallyl naphthalene-dicarboxylate, diallyl itaconate, divinyl itaconate, divinyl maleate, diallyl succinate, diisopropenyl succinate, dibutenyl succinate, divinyl succinate, diallyl adipate, divinyl adipate, diallyl azelate, divinyl azelate, diisopropenyl suberate, divinyl pimelate, diallyl glutarate, diisopropenyl glutarate, divinyl sebacate, diallyl sebacate, diallyl japanate, divinyl octadecanedioate, vinyl 11-acryloxy-undecanoate, allyl 11-methacryloxy undecanoate, isopropenyl 5-crotonoxy-caproate, vinyl 4-acryloxy-caproate, vinyl 11-vinyloxy-undecanoate, allyl 11-allyloxy-undecanoate, vinyl 11-allyloxy-undecanoate, isopropenyl 11-isopropenyloxy-undecanoate, vinyl 5-vinyloxy-caproate, vinyl 5-crotyloxy-caproate, vinyl 5-allyloxy-caproate, allyl 5-allyloxy-caproate, isopropenyl 5-isopropenyloxy-caproate, vinyloxy-tetramethylene acrylate, allyloxy-hexamethylene methacrylate, allyloxy-octamethylene crotonate, isopropenyloxy-octamethylene acrylate, crotyloxy-hexamethylene methacrylate, etc.

For many purposes, such as fuel, it is desirable to have a high concentration of the metallo-organo polymeric units present in the compositions. In such cases, the modifiers are used in minor amounts. However, in certain cases, it may be desirable to use the metallo-organo polymeric compositions to modify or fortify the properties of other materials, in which case the metallo-organo derivatives are used in minor amounts.

As indicated above, the metallo-organo polymers of this invention are particularly useful as solid fuels. They can be used as the main fuel component or can be added to various types of other fuels to fortify or supplement such fuels. For example, they can be used as additives to gasoline and other motor fuels, to kerosene and other materials used for turbojet engines and jet engines, and can be added to liquid and solid propellant fuels used for rockets, missiles, etc. However, these polymeric compositions are particularly useful as the main fuel component in solid propellant fuels used for rockets and related devices. In such latter cases, it is advantageous to convert the fuel to an infusible form. If modifiers, or auxiliary agents, are to be added, this can be effected before conversion to infusibility. Depending on the particular manner in which the fuel is to be used, it can be in solution, powder, rod, cylinder, or whatever other shape is convenient.

While such products should be made and stored under inert atmospheres, it is surprising that considerable amounts of oxidizing agents can be incorporated into these polymeric compositions and can be stored in inert atmospheres without danger of premature ignition or explosion. After the desired amount of oxidizing agent has been incorporated into the polymeric composition, it can be converted to an infusible form by various means including the addition of the metallo-organo compounds or catalysts to catalyze further metallo addition to unsaturated groups, the application of moderate heating for similar addition, or effecting crosslinking through the unsaturated groups themselves by heat alone, or by the addition of peroxy, azo, or other free radical-generating catalysts, or by any other means of crosslinking. The organo-metallo polymers can also be in infusible form before mixture with the oxidizing agent, having the polymers in finely divided form for intimate mixture. In such cases, if desired, the powder mixture can be cast by the addition of adhesive or resin.

In addition to oxygen-containing materials, such as free oxygen, hydrogen peroxide, etc., sometimes used to support combustion of fuels, other "oxidizing" materials, such as fluorine, chlorine, etc., can also be used to generate energy from these fuels.

Oxidizing agents which can be incorporated in the resin for the ultimate purpose of supporting combustion of the resin and which can be incorporated in accordance with safety conditions determined by their reactivity, include: the solid and liquid perchloryl aryl compounds of the formula Ar—Cl—$O_3$, such as perchloryl benzene, perchloryl toluene, etc., various perchlorates, nitrates, oxides, persulfates, and perborates of metals and ammonia, such as ammonium perchlorate, potassium perchlorate, sodium perchlorate, ammonium nitrate, potassium nitrate, sodium nitrate, potassium permanganate, potassium chlorate, manganese dioxide, potassium iodate, potassium dichromate, chloric acid, perchloric acid, ammonium persulfate, ammonium dichromate, ammonium iodate, aluminum nitrate, barium chloride, barium perchlorate, barium permanganate, lithium perchlorate, lithium dichromate, lithium permanganate, etc.

Some of these oxidizing agents are not self-sustaining oxidizing agents, and can be used when free oxygen, or compositions such as perchloryl fluoride, highly concentrated hydrogen peroxide, etc., which generate oxygen in situ, are passed in surface contact with the fuel. The liquid oxidizing agents can be incorporated with precautions to assure uniform distribution through the polymer mass and to avoid ignition or explosive conditions during preparation and use of the fuel. It is desirable that the products from reaction of the oxidizing agent and the resin are gaseous in their normal state so that the energy developed in the system will not be robbed of energy to convert them to the gaseous state.

It is generally desirable that the fuel be molded in the shape in which it is ultimately to be used before the composition is converted to an infusible state. In fact, the fuel can even be cast or molded as one entire unit which will comprise the entire fuel load for one rocket and can be substantially as long as the rocket if desired. Therefore, the size is limited only by the size of the rocket in which it is to be used.

It is possible to make the fuel in other shapes than indicated above and have the fuel machined to give the desired shape. For example, cylindrical shapes are generally desirable with an opening running through the cylinder along its linear axis. If desired, there can be a plurality of such openings running through the length of the mass so that more than one oxidizing stream can function simultaneously. However, various other shapes can be used, such as blocks having rectangular or square cross sections with one or more openings running along the linear axis of the block.

While the aforementioned shapes are preferred, it is also possible to use smaller units or shapes made by the practice of this invention, and then to assemble them in a space or container advantageously in such a manner that one or more open linear paths are left through the assembled mass so that the oxidizing gas and/or the combustion gases can be passed therethrough. For example, the fuel can be in the shape of discs with an opening in the center, or in half or quarter discs, or even with rectangular, square, or various other cross-sections so that upon assembly, one or more openings for the oxidizing gas are formed through the assembled mass. A cylindrical mass can be made of a number of concentric cylinders for which the outer diameter of one is slightly less than the diameter of the inside linear opening of another so that the assembled cylindrical mass actually comprises a number of cylindrical sleeves which fit over one another. The axial opening of the one having the smallest diameter would be the linear axis opening of the assembled mass.

In addition to the foregoing, the resin-oxidizing agent composition can be made in various other shapes, depending on the manner in which it is ultimately to be used. As a further example, it can be shaped as a solid rod, in which case the burning surface will be the outer surface of the rod or cylinder. The outer surface of the rod can be ignited and if a supplementary oxidizing fluid is used, this can be directed against such outer surface of the rod. If desired, the rod can be advanced through an opening in accordance with the desired rate at which the surface is to be exposed to a supplementary oxidizing fluid. The composition can also be shaped in the form of granules, pellets, etc., where it is desired to modify the surface area that is to be exposed for combustion. Such granules can be used as such, or can be adhered to metal surfaces in accordance with the present known art in the use of solid propellant fuel in granular form.

When the oxidizing agent to be added is a solid, it is desirably in fine particle size so as to permit substantially uniform distribution throughout the mass. The oxidizing composition which is to be passed in surface contact with the fuel is of the type generally used presently, such as pure or highly concentrated oxygen. The upper limit in the amount of oxidizing agent to be used is determined by the concentration that can safely be used under the conditions ultimately existing in the fuel zone of the rocket, or by that excess over the stoichiometric amount required for complete combustion of the fuel, whichever limit is reached first. Obviously, the safety limit will vary according to the type of auxiliary oxidizing agent used, the type of fuel base material used together with its heat capacity and heat transmission properties, the temperature which will exist in the preparation and use of the fuel, etc.

Since the fuel composition of this invention can be used according to various methods, varying from the use of a substantial amount of supplemental oxidizing fluid to that in which the combustion is self-sustained by the oxidizing compound contained in the fuel, the minimum amount of such oxidizing agent contained in the fuel will depend on the manner in which the fuel is to be used. When the combustion is to be maintained partly by an oxidizing agent in the fuel and partly by the oxidizing agent pumped through the opening, then obviously the supplemental effect of one agent toward the other will depend on the particular material being used as the oxidizing agent in the fuel and on the particular oxidizing fluid being fed through the opening.

Moreover, in each case the relative amounts cannot be determined on a weight basis but must be determined on the basis of the amount of oxygen available in the particular oxidizing agent used to support the combustion. This depends on the oxygen content of the oxidizing agent and the percent of that oxygen which is liberated for oxidizing purposes upon decomposition of the oxidizing agent. Furthermore, this depends somewhat on the efficiency with which it is desired to consume the fuel. For example, it might be desirable to have a considerable excess of oxidizing agent so as to consume the fuel more completely, even though it might mean an inefficient use of the oxidizing agent. Again, if it is permissible to use the fuel with a low efficiency for use of B.t.u. content, then it may be desirable to use a smaller amount of oxidizing agent.

The amount of oxidizing agent imbedded in the fuel itself can be further decreased when a supplemental oxidizing fluid is being pumped into contact with the fuel. Obviously, therefore, the proportion of oxidizing agent imbedded in the fuel base material can vary from 5 percent to approximately 95 percent depending on the various factors involved, such as the efficiency desired, the method and convenience of operation, and the materials being used. Generally, when an oxidizing agent is imbedded in the base material, it is advantageous to use from about 5 percent to 95 percent, preferably about 20 percent to about 80 percent based on the combined weight of oxidizing agent, base material, and any crosslinking modifier that is used.

When an oxidizing agent is used in the fuel base material of the type and in the amount that will be self-sustaining in the combustion of the fuel base material, there will be no need to use an oxidizing fluid on the surface of the fuel. In such cases, the combustion of the fuel is initiated by igniting it by various means presently used for that purpose, such as a mixture of hydrazine, or unsymmetrical dimethyl hydrazine, and nitric acid, or by triethyl aluminum and oxygen, or by a torch, or by an electrical ignition system. When the oxidizing agent is not present in self-sustaining amount, liquid oxygen or an efficient oxidizing compound such as perchloryl fluoride ($FClO_3$) can be pumped into contact with the surface of the fuel to supply the oxygen for combustion. In some cases highly concentrated hydrogen peroxide, such as 98 percent hydrogen peroxide can be used to supply oxygen for combustion.

When a self-sustaining oxidizing agent is distributed throughout the fuel, the desirable amount can be determined by calculating the stoichiometric equivalent required for combustion of the fuel, and adjusting the calculation by subtracting, where less than 100 percent efficiency is satisfactory, or adding, where desired, an excess to compensate for the lack of 100 percent efficiency in the actual combustion. Since the conditions of operation do not permit the time and type of mixing which give 100 percent efficiency, where other factors permit, it is sometimes desirable to have an excess of oxidizing agent which will give 50 percent, or even as high as 100 percent more than the stoichiometric amount of oxygen. When it is permissible or desirable to sacrifice some of the efficiency of the B.t.u. content of the fuel, the stoichiometric amount or even less than that amount of the oxidizing agent can be used, depending on the fuel efficiency desired.

The oxidizing agent and/or modifier can be introduced or suspended in the solid fuel in any convenient or appropriate manner. The mixture can be effected mechanically as on mixing mills, on a Banbury mixer, any single or double worm extruder, or by rotation of the mold when the material is being cast from a liquid state. When a solid is to be added, thermoplastic material can desirably be softened by the addition of a softening agent, or, as indicated above, by the modifier itself. Such compounded mixtures can then be extruded, or otherwise shaped into the desired form and then polymerized to infusibility. In some cases, depending on the particle size of the solid oxidizing agent and the amount of void space between particles, the polymer in fluid state, or the intermediate from which it is to be prepared, can be poured into a container holding the solid oxidizing agent and thereby fill the void spaces. Then upon standing at room temperature, or at slightly raised temperatures, the polymer will be converted to an infusible state with the oxidizing agent embedded therein.

However, whichever method of mixing is used, it is desirable to avoid the generation of heat that will raise the temperature to the ignition point of the oxidizing agent. Therefore, in some cases, it is desirable to pre-cool the materials to be mixed, or to provide means to withdraw the heat as it is generated.

While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims.

The invention claimed is:

1. The process for the preparation of a polymeric product comprising the step of reacting a composition consisting essentially of at least two metal compounds each containing a different metal and selected from the class consisting of boron hydrides, aluminum hydrides, beryllium hydrides, magnesium hydrides and the hydrocarbon derivatives of said hydrides, with at least one unsaturated compound having at least two ethylenically unsaturated groups therein and selected from the class consisting of ethylenically unsaturated hydrocarbon compounds and derivatives thereof, said derivatives consisting of hydrocarbon and ether groups.

2. The process of claim 1, in which said unsaturated compound is butadiene.

3. The process of claim 1, in which said unsaturated compound is diallyl.

4. The process of claim 1, in which said unsaturated compound is acetylene.

5. The process of claim 1, in which said unsaturated compound is divinyl ether.

6. The process of claim 1 in which said unsaturated compound is divinyl benzene.

7. The process of claim 1 in which said unsaturated compound is allene.

8. The process of claim 1 in which said unsaturated compound is diallyl ether.

9. The process of claim 1 in which said unsaturated compound is diallyl benzene.

10. The process of claim 1 in which said unsaturated compound is vinyl acetylene.

11. A polymer consisting essentially of a plurality of at least two different repeating units in the polymer chains thereof selected from the class consisting of —Be—Y—, —Mg—Y—,

and

wherein X is a radical selected from the class consisting of hydrogen, monovalent hydrocarbon and Y radicals; and Y represents a polyvalent radical selected from the class consisting of polyvalent hydrocarbon radicals and ether derivatives thereof consisting of hydrocarbon and ether groups, having the valencies of Y extending from an aliphatic carbon atom therein, and having any valencies of said Y in excess of the two shown in each of said formulas also attached to said metal atoms, said aliphatic carbon atom having at least one other aliphatic carbon atom attached thereto, and the total weight of each of said metals in said polymer being no less than 0.05 percent by weight of said polymer.

12. A polymer of claim 7 in which the combined weight of the metal in said repeating units is no less than 4 percent by weight of said polymer.

13. A polymer consisting essentially of a plurality of repeating units in the polymer chains thereof having the formulas

and

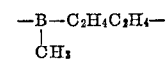

the metal portion of said repeating units being no less than 4 percent by weight of said polymer.

14. A polymer consisting essentially of a plurality of repeating units in the polymer chains thereof having the formulas

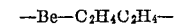

and

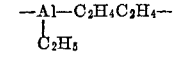

the metal portion of said repeating units being no less than 4 percent by weight of said polymer.

15. A polymer consisting essentially of a plurality of repeating units in the polymer chains thereof having the formulas

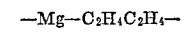

and

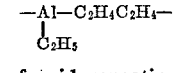

the metal portion of said repeating units being no less than 4 percent by weight of said polymer.

16. A polymer consisting essentially of a plurality of repeating units in the polymer chains thereof having the formulas

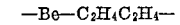

and

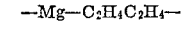

the metal portion of said repeating units being no less than 4 percent by weight of said polymer.

17. A polymer consisting essentially of a plurality of repeating units in the polymer chains thereof having the formulas

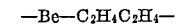

and

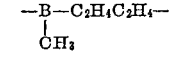

the metal portion of said repeating units being no less than 4 percent by weight of said polymer.

18. A polymer consisting essentially of a plurality of repeating units in the polymer chains thereof having the formulas

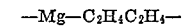

and

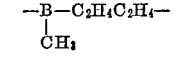

the metal portion of said repeating units being no less than 4 percent by weight of said polymer.

19. A polymer consisting essentially of a plurality of repeating units in the polymer chains thereof having the formulas

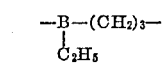

and

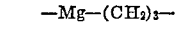

the metal portion of said repeating units being no less than 4 percent by weight of said polymer.

20. A polymer consisting essentially of a plurality of repeating units in the polymer chains thereof having the formulas

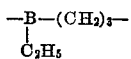

and

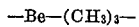

the metal portion of said repeating units being no less than 4 percent by weight of said polymer.

21. A polymer consisting essentially of a plurality of repeating units in the polymer chains thereof having the formulas

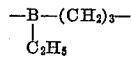

and

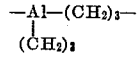

the metal portion of said repeating units being no less than 4 percent by weight of said polymer.

22. A polymer consisting essentially of a plurality of repeating units in the polymer chains thereof having the formulas

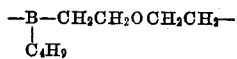

and

the metal portion of said repeating units being no less than 4 percent by weight of said polymer.

References Cited in the file of this patent

UNITED STATES PATENTS

| | | |
|---|---|---|
| 2,699,457 | Ziegler et al. | Jan. 11, 1955 |
| 2,744,074 | Theobald | May 1, 1956 |
| 2,775,563 | Wiczer | Dec. 25, 1956 |
| 2,929,697 | Perry et al. | Mar. 22, 1960 |
| 2,954,284 | Toulmin | Sept. 27, 1960 |

OTHER REFERENCES

"The Condensed Chemical Dictionary," p. 532, 4th ed., published by Reinhold Pub. Corp., N.Y. (1950).